United States Patent [19]

Schmuck

[11] 4,267,805

[45] May 19, 1981

[54] INTERNAL COMBUSTION ENGINE

[75] Inventor: Johann Schmuck, Bad Feilnbach, Fed. Rep. of Germany

[73] Assignee: Motorenfabrik Hatz GmbH & Co. KG, Ruhstorf, Fed. Rep. of Germany

[21] Appl. No.: 42,929

[22] Filed: May 29, 1979

[30] Foreign Application Priority Data

Jun. 8, 1978 [DE] Fed. Rep. of Germany ....... 2825177

[51] Int. Cl.[3] .............................................. F02B 77/00

[52] U.S. Cl. ................................ 123/198 E; 64/1 V; 64/3; 192/112; 181/204; 74/572

[58] Field of Search ..................... 64/1 V, 11 F, 10, 3, 64/4, 27 NM; 123/198 E, 195 R, 195 C, 195 S; 192/112; 181/198, 204, 205; 74/572

[56] References Cited

U.S. PATENT DOCUMENTS

| | | | |
|---|---|---|---|
| 2,659,244 | 11/1953 | Guy | 74/572 |
| 2,909,031 | 10/1959 | Kiekhaefer | 123/198 E |
| 3,464,398 | 9/1969 | Scheiterlein et al. | 123/198 E |
| 4,071,008 | 1/1978 | Skatsche et al. | 123/198 E |
| 4,184,471 | 1/1980 | Kirchweger et al. | 123/198 E |

*Primary Examiner*—Ira S. Lazarus
*Assistant Examiner*—Magdalen Moy
*Attorney, Agent, or Firm*—Blanchard, Flynn, Thiel, Boutell & Tanis

[57] ABSTRACT

An internal combustion engine comprising a flywheel mounted on a crankshaft and an aggregate housing which surrounds the flywheel and is mounted on the crank housing by vibration-damping buffer elements extending tangentially of the flywheel, which aggregate housing rotatably supports a drive shaft for an aggregate driven by the engine.

7 Claims, 4 Drawing Figures

INTERNAL COMBUSTION ENGINE

FIELD OF THE INVENTION

This invention relates to a vibration damping construction and, more particularly, to a vibration damping construction for isolating the vibrations generated by an internal combustion engine from an aggregate driven off the flywheel of the engine.

BACKGROUND OF THE INVENTION

It is already known to associate with the fastening screws which are used to connect various elements, buffer elements which are made of an elastic material for the purpose of vibration and noise damping of aggregate members. The buffer elements are constructed preferably as buffer sleeves which surround the screws. In the known arrangements of this type, the fastening screws and their buffer sleeves have been arranged parallel with respect to the axis of the crankshaft or of the shaft which serves to drive the aggregate. It has been shown that each buffer sleeve is heavily stressed, in particular in the case of heavy, unsupported aggregates, and has a tendency toward undesired high deformations. The vibrations of the aggregate members cannot be eliminated to the desired degree over longer periods of time by buffer elements which are arranged in this manner and are supported in compactly constructed dimensions.

The purpose of the present invention is to overcome these disadvantages of the known type of construction and to provide an arrangement which is more resistant with respect to deformations and thus is suited for a long life vibration damping.

BRIEF DESCRIPTION OF THE DRAWINGS

One exemplary embodiment of the subject matter of the invention is discussed in the following description with reference to the drawings, in which.

DETAILED DESCRIPTION

Figure 1:
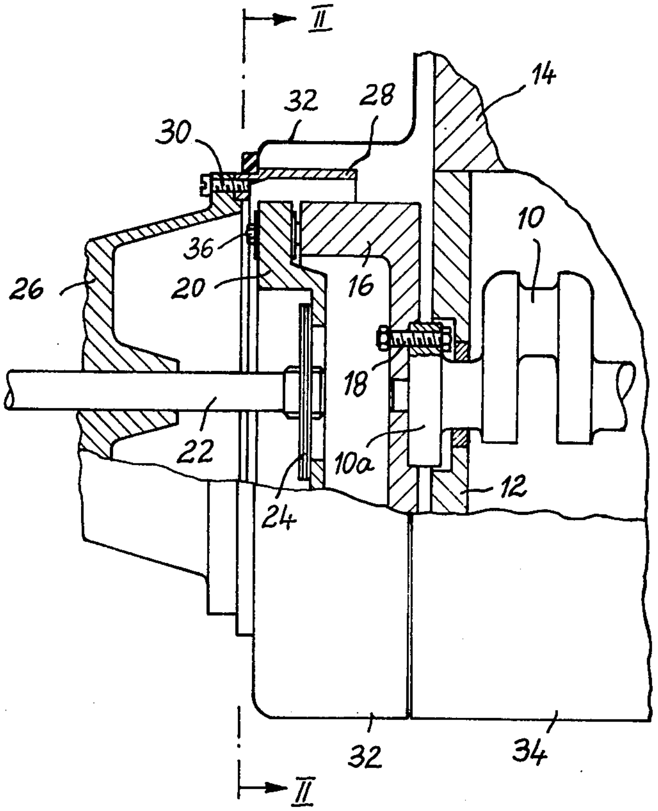
FIG. 1 is a partial longitudinal cross-sectional view of the drive arrangement of the internal combustion engine.
Figure 2:
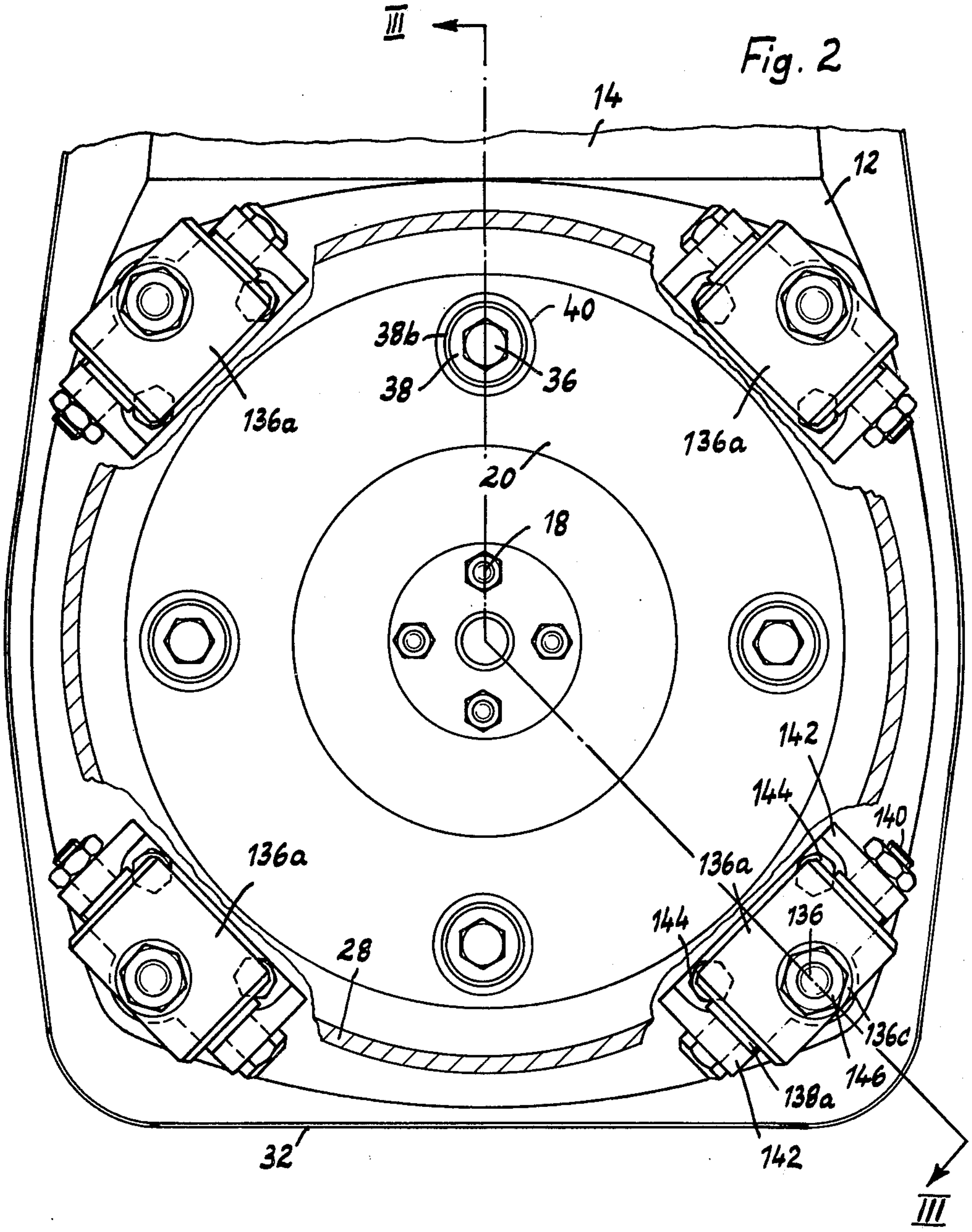
FIG. 2 is an enlarged cross-sectional view taken along the line II—II of FIG. 1.

According to FIG. 1, the crankshaft 10 of a conventional internal combustion engine is supported in a crank housing 12, on which the cylinder block 14 is fastened. One end 10*a* of the crankshaft 10 projects through an opening in the wall of the housing 12. A flywheel 16 is fastened to the laterally projecting end 10*a* of the crankshaft 10 by means of screws 18. It is known in the field of internal combustion engines to use the flywheel for driving various aggregates, wherein as a rule a releasable clutch is provided in order to be able to selectively interrupt the transmission of torque from the internal combustion engine to the aggregate. In the present exemplary embodiment of such an aggregate drive, the flywheel 16 is fixedly connected to a clutch disk 20, with which a counterclutch disk 24 which is fastened to a shaft 22 can frictionally engage. By axially shifting the shaft 22 with the help of a switching mechanism (not illustrated) the coupling engagement of the elements 20 and 24 can be made or released. The shaft 22 which drives the aggregate (not illustrated) is guided in a bearing member 26, which is fixedly connected by means of screws 30 to a stationary housing 28 which surrounds the flywheel 16. The housing parts 12, 14 and 28 are furthermore covered by outer cover plates 32 and 34, in order to muffle noises produced by the internal combustion engine. (Anchoring of the cover plates 32 and 34 on the internal combustion engine is of no importance for the present invention and is therefore neither illustrated in detail nor discussed in detail.)

In order that vibrations generated by the internal combustion engine cannot be forwarded through the flywheel and the associated clutch to the driven aggregate and cause undesired noises, the following damping precautions are taken.

Figure 3:
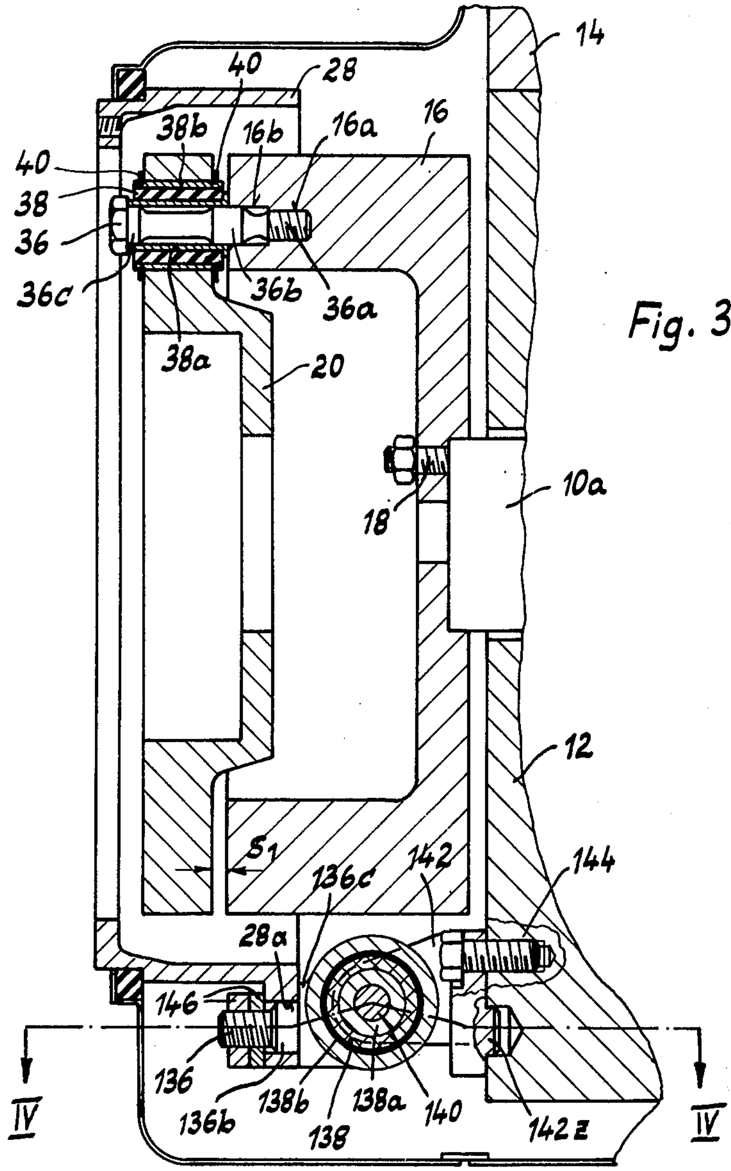
FIG. 3 is a longitudinal cross-sectional view taken along the line III—III of FIG. 2.

The clutch disk 20 does not lie directly on the front surface of the flywheel 16, but between the surfaces of said parts which face one another there is provided an air gap S1 (FIG. 3). The parts are connected with one another by means of screws 36 and buffer sleeves 38. Each screw 36 is threadedly engaged with its threaded part 36*a* in a threaded hole 16*a* in the flywheel 16 and has cylindrical guide surfaces 36*b* and 36*c* axially spaced on the shaft thereof. The guide surface 36*b* is snugly guided in an opening 16*b* in the flywheel 16, so that a defined form locking exists between the parts 16 and 36.

Each buffer sleeve 38 is made of an elastic damping material, for example rubber, and is fixedly connected on the inside and outside thereof to a metallic sleeve 38*a* and 38*b*, respectively, for example by welding under thermal action. The sleeve 38 has in the finished condition only a small amount of elasticity, which is chosen corresponding to the given operating conditions during the manufacture or connection of the parts 38, 38*a* and 38*b* such that the desired vibrating or damping action is just yet achieved. The inner sleeve 38*a* is thereby positioned with a snug fit on the axially spaced guide surfaces 36*b* and 36*c* of the screw 36 and is clamped between the flywheel 16 and the head of the screw 36. The openings in the clutch disk 20 are moved over the outer sleeve 38*b* and the clutch disk 20 is held in the necessary axial position on the buffer 38 with the help of two snap rings 40, each of which is received in grooves in the sleeve 38. In this manner, the clutch disk 20 is connected both radially and also axially to the flywheel 16, however, the transfer of the torque occurs only through the buffer sleeves 38.

Figure 4:
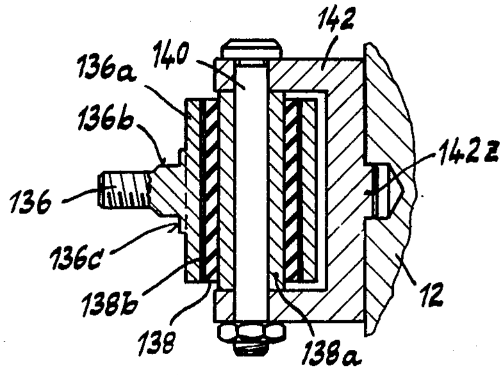
FIG. 4 is a cross-sectional view of the holder of a fastening screw taken along the line IV—IV of FIG. 3.

A connection which is created through screws and buffer sleeves is also provided between the stationary crank housing 12, the housing 28 and the bearing member 26. A forklike bearing block 142 (FIGS. 3 and 4) is fastened by means of two mounting screws 144 and one centering pin 142*z* on the crank housing 12. A fastening stud screw 136 is constructed in one piece with a hollow cylindrical sleeve 136*a*, wherein the axis of the screw 136 and its sleeve 136*a* are positioned perpendicularly to one another. An elastic buffer sleeve 138 is connected on the inside and on the outside thereof to sleeve 138*a* and 138*b*, respectively. With respect to the material and the manufacture of the buffer sleeve 138, the discussions which have been given in connection with the buffer sleeve 38 are similarly applicable, so that they need not be repeated. Each buffer sleeve 138 is secured in the bearing block 142 with the help of a holding screw 140, as is clearly shown in FIG. 4. The inner sleeve 138*a* is positioned between the legs of the bearing block 142.

Four bearing blocks 142 are distributed evenly with their buffer sleeves 138 and fastening screws 136 around the periphery of the flywheel 16, and are arranged so that the buffer sleeves 138 each extend tangentially with respect to the flywheel 16. The axes of the fastening screws 136 extend parallel with respect to the axis of the flywheel 16. The housing 28 has plural openings 28*a* around its perimeter, each of which receives the shoulder 136*b* of each fastening screw 136 therein and rests at the same time with its front surface on the support flange 136*c* of said screw 136.

The housing 28 is clamped between nuts 146 threadedly engaged with the fastening screw 136 and the support flange 136*c* and thus is fastened to the crank housing 12 through the bearing block 142.

Due to the tangential arrangement of the buffer sleeves 138, the braking torque or drive torque which acts onto the connecting points and which comes from the internal combustion engine or from the aggregate are absorbed over the periphery of said buffer sleeves, namely over larger surfaces. The wear of the buffer sleeves is thus substantially reduced and their damping action is fully maintained over a longer period of time. With the compact dimensions of the arrangement, a long life and fully effective vibration and sound damping is in this manner achieved.

In conclusion, it is mentioned that, if needed, the buffer sleeves 38 can also be arranged in a similar manner tangentially with respect to the periphery of the flywheel 16.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an internal combustion engine comprising a crankshaft rotatably supported in an engine housing, a flywheel mounted on said crankshaft, an aggregate housing surrounding said flywheel and mounted on said engine housing by fastening means, a drive shaft for an aggregate rotatably journaled in said aggregate housing, and means for drivingly connecting said flywheel to said drive shaft, the improvement comprising wherein said fastening means comprises damping means for damping vibrations between said internal combustion engine and said aggregate housing, which damping means comprise at least one elongate elastic buffer element extending tangentially with respect to said flywheel.

2. The internal combustion engine according to claim 1, wherein said buffer element comprises a first rigid sleeve, an elastic sleeve concentrically disposed within and bonded to the radially inner surface of said first rigid sleeve, and a second rigid sleeve concentrically disposed within and bonded to the radially inner surface of said elastic sleeve.

3. The internal combustion engine according to claim 2, wherein said first and second sleeves are made of metal and said elastic sleeve is made of rubber.

4. The internal combustion engine according to claim 2, wherein said second rigid sleeve is hollow and wherein said damping means includes a fork-like bearing block for said buffer element, said buffer element being supported between the legs of said fork-like bearing block by a holding element extending between said legs through said second rigid sleeve.

5. The internal combustion engine according to claim 4, wherein said bearing block is mounted to said engine housing by at least one mounting screw and has at least one centering pin received in a recess provided in said engine housing, and wherein said buffer element is secured to said aggregate housing by at least one fastening screw provided on the outer surface of said buffer element.

6. The internal combustion engine according to claim 5, wherein said fastening screw is substantially parallel to the axis of said flywheel and is substantially perpendicular to the axis of the associated buffer element.

7. The internal combustion engine according to claim 4, including four buffer elements positioned at circumferentially spaced intervals about the periphery of said flywheel.

* * * * *